Sept. 21, 1971   D. E. GIVAN   3,606,674
METHOD OF MANUFACTURING MAGNETIC CORES FOR DYNAMOELECTRIC
MACHINES AND LAMINATIONS THEREFOR
Filed March 28, 1969  2 Sheets-Sheet 1
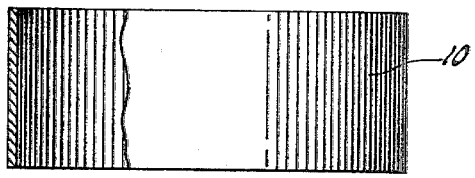
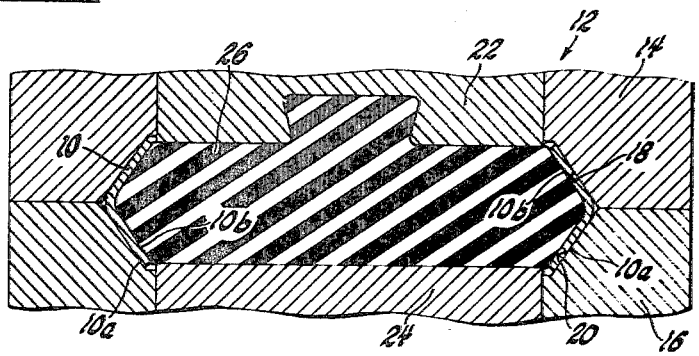
INVENTOR.
David E. Givan
BY
C. L. Meland
ATTORNEY Sept. 21, 1971  D. E. GIVAN  3,606,674
METHOD OF MANUFACTURING MAGNETIC CORES FOR DYNAMOELECTRIC
MACHINES AND LAMINATIONS THEREFOR
Filed March 28, 1969  2 Sheets-Sheet 2
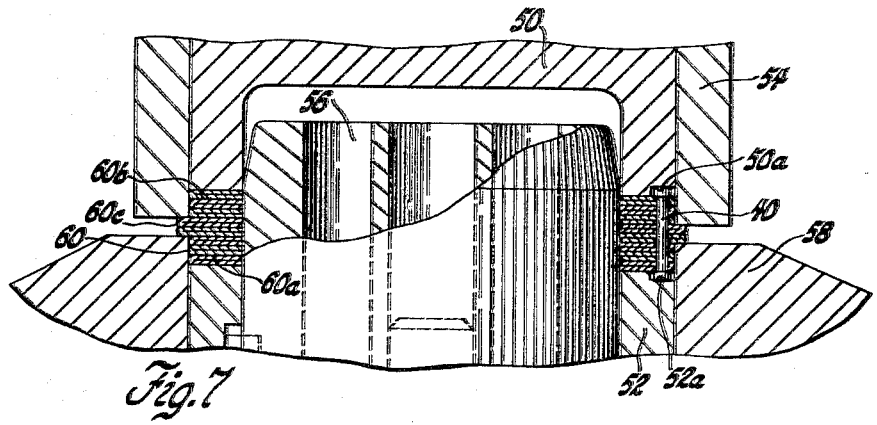
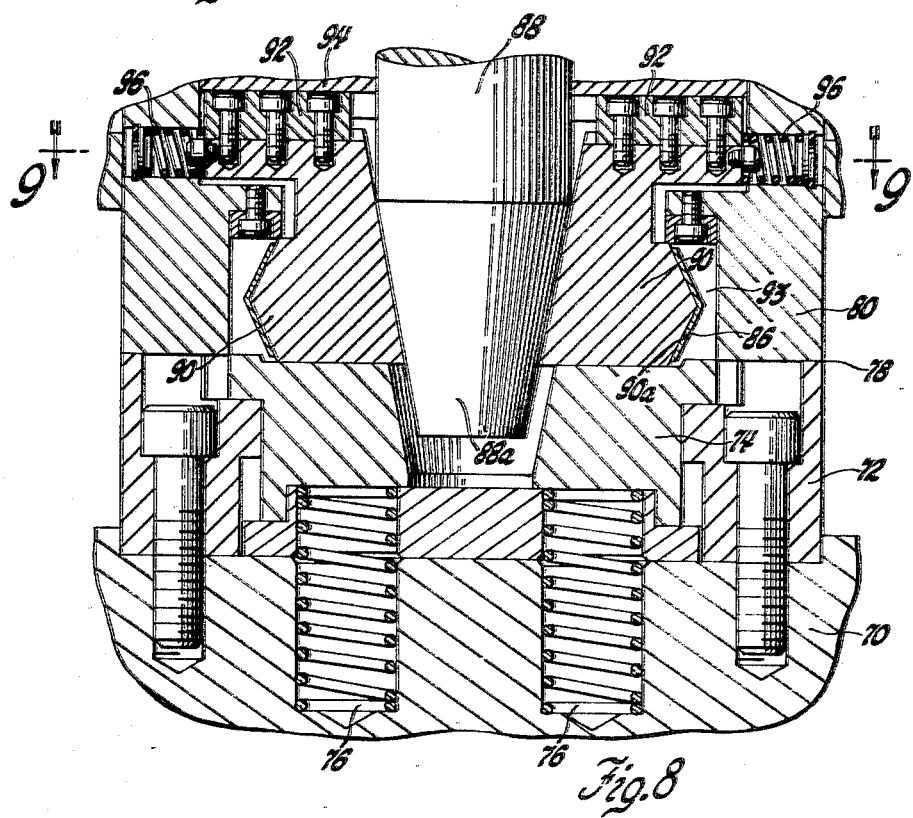
INVENTOR.
David E. Givan
BY
C. R. Meland
ATTORNEY

# United States Patent Office 3,606,674
Patented Sept. 21, 1971

3,606,674
METHOD OF MANUFACTURING MAGNETIC CORES FOR DYNAMOELECTRIC MACHINES AND LAMINATIONS THEREFOR
David E. Givan, Anderson, Ind., assignor to General Motors Corporation, Detroit, Mich.
Filed Mar. 28, 1969, Ser. No. 811,412
Int. Cl. H02k 15/00, 15/14, 15/16
U.S. Cl. 29—596                                                9 Claims

ABSTRACT OF THE DISCLOSURE

A method of manufacturing magnetic cores such as stator cores for dynamoelectric machines and the method of manufacturing the stator laminations that form the magnetic core. In performing the method of this invention a length of steel tubing is formed to provide a part that has a concave inner wall and a convex outer wall. This part is then folded such that half sections of the concave inner wall are forced together to form an annular disk. In practicing the method of this invention it is possible to simultaneously fold and coin the metal part to thereby provide a lamination which is useful in forming a finished magnetic core. As an alternative to this method this invention contemplates folding the metal material without coining, stacking the annular disks formed by the folding operation and then coining the stacked laminations to form a finished stator core. Following the folding of the metal material or following the simultaneous folding and coining of the metal material the disk is provided with slots for receiving a stator winding. The method of this invention reduces the amount of scrap produced as compared to conventional methods of fabricating stator laminations and stator cores.

---

This invention relates to a method of manufacturing magnetic cores and laminations therefor for electrical apparatus and more particularly to a method of manufacturing stator cores and laminations for annular stator cores of dynamoelectric machines. In manufacturing the annular stator cores for dynamoelectric machines it is common practice to provide a length of flat sheet steel which is progressively fed through a machine that pierces the sheet of steel material to stamp out the stator laminations from the sheet of steel. In performing this operation the lamination that is stamped-out has an outer diameter which is substantially the same as the width of the sheet steel material to reduce scrap as far as possible.

In electrical manufacturing operations, where the manufacturer needs a rotor part as well as stator part, the center stamped-out section of the stator part can sometimes be utilized to form rotor laminations so as to further reduce the amount of scrap incident to the manufacture of the stator laminations.

Even where the center stamped-out section of the annular stator lamination is utilized in the fabrication of rotors there nevertheless is a considerable amount of scrap. This results from the fact that a certain annular portion of the material between the outer diameter of the stamped-out rotor lamination and the inner diameter of the stator lamination will result in scrap. There is also a certain amount of scrap due to the fact that some material is lost adjacent the outer periphery of the stator lamination since it is impossible to utilize all the material when stamping adjacent circular parts even where the outer diameter of these parts substantially equals the width of the sheet steel.

The principal object of this invention is to provide a method of manufacturing laminations for the core member of electrical apparatus and to a method of manufacturing the core member which reduces scrap to a minimum and where the only scrap produced by the method of this invention is the material cut out of the stator laminations to form the conductor receiving slots and in some cases material pierced out of the laminations to form holes for receiving rivets or the like to hold the laminations together in the completed stator assembly.

The method of this invention contemplates providing a short length of tubular magnetic material which is just of the right length to provide a stator lamination, forming this length of tubular magnetic material into an annular part having a concave interior wall and a convex exterior wall and then folding the concave interior wall of the annular part together by a pressing operation. In accordance with this invention the pressing operation may actually be done under high pressure so as to in effect provide a combined folding and coining operation to thereby provide a finished dimension stator lamination that can be used as part of a magnetic core. On the other hand, this invention contemplates folding the concave inner walls of the annular parts together without coining, stacking a series of these folded parts, and then coining the stacked parts to form a finished stator core having a predetermined inner and outer diameter. In either method the coining operation determines the final dimension of either a single folded stator lamination or a stack of folded stator laminations.

After the stator laminations are formed either by a folding operation or by a folding and coining operation a plurality of slots are formed by piercing which are adapted to receive electrical conductors. With the method of this invention the finished stator lamination utilizes all of the material of the original short tubular part with the exception of material that has been pierced out and the tubular part is cut to such a length as to provide only the amount of material required for the stator lamination.

It accordingly is one of the objects of this invention to provide a method of manufacturing a stator lamination for use in forming a completed stator assembly where the lamination is formed by folding the walls of a tubular part together to form an annular disk. In carrying this object forward the disk may be folded and coined in one operation where it is then ready for use in manufacturing a stator core or may be only folded and a series of these folded annular disks stacked and then coined to form a stator assembly having precise dimensions.

In performing the method of this invention the manufacturer can provide tubular steel parts by manufacturing an elongated tube from flat sheet steel material and then cutting off lengths of this tube which are of precise length to form the desired folded lamination.

It accordingly is another object of this invention to provide a method of manufacturing stator laminations where flat sheet steel is formed into an elongated tube, lengths of this tube are cut off to a precise dimension, these lengths are then formed into an annular part having a C-shaped cross section and the part is then folded such that the inner walls defining the C-shaped part are moved together to form a disk-shaped stator lamination. The folding, as previously pointed out, may also be accompanied by a coining operation or the folded parts can be stacked in a stacked assembly and then coined to provide the final dimension for the stator core.

In the drawings:

FIG. 1 is a side view partly in section of a length of steel tubing which ultimately becomes a stator lamination after it is acted upon by the method of this invention;

FIG. 2 is a sectional view of a bulging die illustrating the method of bending the tubular part shown in FIG. 1 into the shape of the part shown in FIG. 2;

FIG. 3 is a sectional view of a coining die which is operable to bend the part shown in FIG. 3 into the shape illustrated in FIG. 4;

FIG. 4 is an end view partly in section of a stator lamination formed by the method shown in FIGS. 1 through 3 and prior to the piercing of this lamination to form stator slots;

FIG. 5 is an end view of a completed stator assembly made up of stator laminations formed by the method of this invention;

FIG. 6 is a perspective view partly in section of a completed stator assembly using the laminations formed by the method of this invention;

FIG. 7 is a sectional view of apparatus for coining a stack of steel laminations which have been formed by a folding operation;

FIG. 8 is a sectional view of apparatus for bulging a tubular part into a generally C-shaped cross section for use in performing the method of this invention; and FIG. 9 is a partial sectional view taken along line 9—9 of FIG. 8.

The present invention is concerned with forming the stator lamination shown in FIG. 4 from the tubular steel part shown in FIG. 1 or for forming folded annular disks similar to the part shown in FIG. 4 as is more fully described hereinafter. In performing the method of this invention an elongated steel tube is provided which can be formed in a conventional tube mill from flat sheet steel material. By way of example, this sheet of steel material may be type AISI 1008 Hot Rolled steel which may have a thickness of .035 inch. It is also possible to use sheet steel of a greater thickness but of the same type, for example, a steel which has a thickness of .053 inch.

After the steel tube has been formed in a tube mill predetermined lengths of this steel are cut off the tube and one of these lengths is illustrated in FIG. 1 and identified by reference numeral 10. The radial dimension A of the lamination illustrated in FIG. 4 is of course related to the length of the tubular part 10 shown in FIG. 1 when performing the method of this invention and this is taken into account in determining the length of tubular material to be cut off for a particular diameter stator lamination.

When the tubular part 10 has been provided, as shown in FIG. 1, by cutting it off from an elongated tube the part 10 is placed in a bulging die generally designated by reference numeral 12 and illustrated in section in FIG. 2. This bulging die includes annular die parts 14 and 16 which respectively have diverging die faces 18 and 20. The bulging die further includes parts 22 and 24 and a part 26 which moves radially when the parts 22 and 24 are moved toward each other. The part 26, for example, can be formed of a rubber material which expands radially outwardly when compressed between parts 22 and 24. The tubular part 10 can also be formed by a bulging apparatus including metal die parts which are cammed radially outwardly by a tapered center arbor as is described hereinafter with regard to FIGS. 8 and 9 of the drawings.

The bulging die 12 of FIG. 2 will bend the tubular part 10 from its shape shown in FIG. 1 to the shape illustrated in FIG. 2 and it is seen that the straight tube wall of the part shown in FIG. 1 is bent into a generally C-shaped cross section providing a part having an outer convex wall 10A and an inner concave wall 10B.

In order to transform the tubular part shown in FIG. 1 into the C-shaped part of FIG. 3 the tubular part 10 is placed within the bulging die shown in FIG. 2. The die shown in FIG. 2 is shown in its fully closed position. In placing the tubular part 10 in the bulging die the part is slipped over the expandable rubber section 26 since in the open position of the die 12 the part 26 has an outer diameter which is substantially equal to the inner diameter of the tubular part 10 in its shape shown in FIG. 1. With the tubular part 10 in place in the bulging die 12 and in its shape shown in FIG. 1 the die parts 22 and 24 and 14 and 16 are moved toward each other by a suitable press. During this operation the rubber member 26 expands radially outwardly forcing the straight walls of the tubular part against die faces 18 and 20 and into the C-shaped configuration shown in FIG. 2. When the pressure is removed from die part 26 it returns to a position of such a diameter that the part 10 can be slipped off the die part 26.

After the C-shaped annular part has been formed to the shape shown in FIG. 2 it is placed in a coining die which has been generally designated by reference numeral 28. The coining die 28 includes center arbors 30 and 32, an annular die part 34 and annular movable punches 36 and 38. The C-shaped part 10 is shown in a partly folded position in FIG. 3 within the coining die and during the operation shown in FIG. 3 the C-shaped part is folded to provide the disk-shaped part shown in FIG. 4. In the FIG. 3 operation the punches 36 and 38 are moved toward each other by a press (300 tons) to fold half sections of the inner concave wall section 10B of the part 10 into abutting relationship with each other as is depicted in FIG. 4. During this folding or coining operation the desired inner and outer diameter for the lamination shown in FIG. 4 is maintained at exact dimensions by the provision of the center arbors 30 and 32 and the outer annular die 34 which are spaced by the radial dimension A of the stator lamination. As the part shown in FIG. 3 is folded together under high pressure (300 tons) there is some radial cold flow of metal and this cold flow is confined inwardly to the outer diameter of one of the arbors 30 and 32 and outwardly to the inner diameter of the die part 34. This means that the stator lamination, as shown in FIG. 4, will have a fixed inner and outer diameter even though it is formed by folding the material together during the operation depicted in FIG. 3.

The stator lamination as shown in FIG. 4 will have a thickness which is slightly less than twice the wall thickness of the tubular part 10 shown in FIG. 1 and a radial dimension A. It will be appreciated from an inspection of FIG. 4 that the peripheral edge 10C is not severed during the coining operation illustrated in FIG. 3 but rather the material is folded on itself during the FIG. 3 operation. It will also be appreciated that the convex wall 10A ultimately becomes the parallel faces for the lamination shown in FIG. 4 and that the ends of the tube 10 shown in FIG. 1 become aligned as shown in FIG. 4.

Following the forming of the lamination as shown in FIG. 4 the lamination is pierced to form slots 38 for receiving the stator winding of a dynamoelectric machine.

After the slots have been formed in the laminations the stator laminations are stacked and can then be secured together to form a stator assembly of the type illustrated in FIG. 6. The stator laminations can be held together by any suitable means such as rivets 40 which pass through openings formed in the laminations. These openings can be provided at the same time that the stator slots are provided by a piercing operation.

In FIG. 6 the center laminations 42 and 44 are shown as being of larger diameter than the other laminations and these are provided to provide clamping shoulders for clamping the stator between two end frames of a dynamoelectric machine in a manner illustrated in the patent to Redick et al., 3,219,860. Where larger diameter laminations are used they are pierced when the stator slots are formed to form through bolt slots 43.

The completed stator core shown in FIG. 6 is intended for use in alternating current generators of the type disclosed in the above-mentioned Redick et al. patent but it will be appreciated by those skilled in the art that the method of this invention could be utilized to form stator laminations for other types of dynamoelectric machines such as induction motors.

Instead of coining each individual lamination to its final dimension and then utilizing the individual laminations to form a stacked stator assembly it is possible to coin all of the laminations after they have been folded, pierced, stacked and assembled. This method results in a savings in time required to manufacture a given number of stator cores and this method will now be described in detail.

In utilizing the method where the stacked stator laminations are coined in one operation a length of tubular steel as shown in FIG. 1 is provided. The tubular length of steel is then bulged as shown in FIG. 2 and following this operation the bulged C-shaped part is folded to provide a part similar to that shown in FIG. 4. The folding operation is accomplished with a type of die like that shown in FIG. 3 with the exception that the outer diameter of the part need not be confined so that the folding die includes all of the parts shown in FIG. 3 with the exception of the annular die part 34. In other words, the folding operation utilizes equipment including the center arbors 30 and 32 and the punches 36 and 38 which, when brought together, fold the C-shaped part into the configuration of FIG. 4 but do not coin this part to its final dimension. The press that is utilized for the folding operation, of course, requires less pressure since it is not intended that the part be coined but only folded prior to the final coining operation.

After a series of laminations have been folded to the configuration shown in FIG. 4, including smaller diameter and larger diameter laminations and after these laminations have been pierced to form the stator slots and other required openings or slots the laminations are stacked together as shown in FIG. 6 and the openings in the laminations are fitted with rivets 40 and the assembly riveted together. The stacked assembly is then coined in a coining die which is illustrated in FIG. 7.

The coining die of FIG. 7 comprises annular punches 50 and 52 which have recesses 50a and 52a for accommodating the heads of the rivets 40 and an annular punch 54. The recesses are equal in number to the rivets and are circumferentially spaced about the face of the punches 50 and 52. The punches 50 and 54 are moved downward by a press ram (not shown) and suitable hydraulic piston-cylinder devices may be interposed between the ram and the punches. In addition, the coining die of FIG. 7 includes a center arbor designated by reference numeral 56 and an annular die part 58. The die parts 52 and 58 are hydraulically supported from the base of a press that is not illustrated by hydraulic piston-cylinder devices (not illustrated).

The stacked lamination assembly is designated by reference numeral 60 in FIG. 7 and it is understood that this lamination assembly comprises a number of folded but not coined stator laminations which are held together by the rivets 40.

The die assembly of FIG. 7 is operated by a conventional press (not illustrated) and in such an arrangement the arbor 56 is supported by the base of the press and the die part 58 is hydraulically supported therefrom. The punch 52 is moved by a press ram relative to the base of the press during the coining operation and the die part 54 and punch 50 are also moved by the ram.

When it is desired to coin the stacked stator assembly 60 the stator assembly 60 is placed in the die shown in FIG. 7 such that the portion 60a of the stator assembly fits within the die part 58 and about the arbor 56. When the press is now closed the punches 50 and 52 are forced toward each other and the die part 54 is forced toward the die part 58. During this pressing operation the entire stator assembly 60 is subjected to high pressure and is coined to its final dimension. Thus, the punches 50 and 52 compress the entire assembly but any cold flow of the inner diameter of the stator assembly is confined to a predetermined dimension by the outer diameter of the arbor 56. Moreover, cold flow of the outer diameter of the portions 60a and 60b (smaller diameter laminations) of the stator assembly is confined by the die parts 54 and 58. In addition, when the press is closed and high pressure applied the die parts 50, 52, 54 and 58 compress all the folded laminations to a precise axial dimension including the larger diameter laminations 60c but these need not be confined at their outer diameter. During the coining operation some axial pressure is applied to the heads of the rivets 40 which compresses these slightly to the final axial dimension of the stator core.

From the foregoing it will be appreciated that during the coining operation illustrated in FIG. 7 a stacked assembly of folded stator laminations has been coined to its final dimensions (axial and radial) to produce a stator part which will be like that shown in FIG. 6. This operation differs from the alternative method described hereinbefore where each individual stator lamination is folded and coined in one operation and where the coined laminations are then stacked and secured together to form the stator core.

FIGS. 8 and 9 illustrate an alternative method of forming the C-shaped stator lamination from a tubular part like that shown in FIG. 1. In FIGS. 8 and 9 the C-shaped part is formed by what may be termed a wedging or bulging type of apparatus rather than using the die shown in FIG. 2.

Referring now more particularly to FIG. 8, this wedging apparatus includes base parts 70 and 72 the part 70 forming a base for a press that is utilized for the bulging operation to be described. The part 70 is secured to part 72 by bolts as shown. The bulging assembly further includes a part 74 which engages springs 76 positioned between part 74 and part 70. The part 74 is used to eject the bulged stator lamination after the apparatus opens.

The parting line of the apparatus is designated by reference numeral 78 and the parts located above this parting line include the part 80.

It will be appreciated from an inspection of FIG. 8 that the bulging die further includes an axially movable part 88 having a tapered portion 88a which is used to force the wedges 90 radially outwardly when the press is closed. A plurality of wedges 90 are provided as better illustrated in FIG. 9 and there may be for example twelve of these wedges provided to perform the bulging operation. The wedges 90 are secured respectively to guide blocks 92 by fasteners as illustrated and these guide blocks slide within radially extending slots formed in a part 94 of the die assembly. Each wedge 90 is spring biased radially inwardly by a plurality of springs 96. The wedges 90 have an external configuration which conforms to the inner wall of bulged part 86.

In using the bulging die illustrated in FIGS. 8 and 9 a tubular part, such as the part 10 shown in FIG. 1, is placed within the die when in an open position. Wedges 90 will now be held in a retracted position by the springs 96 and in such a position that the outer diameter of the wedges is such that the wedges can fit within the tubular part when the die is closed by a press which is not illustrated. Once the press is closed the part 88 is forced downwardly to cam the wedge-shaped parts 90 outwardly and therefore bulge the tubular part into the shape illustrated in FIG. 8 and into the space designated by reference numeral 93. It will be appreciated that the C-shaped outer wall 90a of each wedge 90 forms the C-shaped part 86 as the wedges are cammed outwardly.

After the C-shaped part 86 has been formed as shown in FIG. 8 the part 88 is retracted permitting the springs 96 to retract the wedges 90 and the part 86 can then be ejected from the die by the part 74.

It will of course be appreciated by those skilled in the art that suitable transfer equipment can be utilized to automatically transfer the tubular parts 10 into the bulging die whether it takes the form shown in FIG. 2 or the form shown in FIGS. 8 and 9. Moreover, suitable automatic transfer equipment can be provided for transferring the bulged part to apparatus such as that shown in FIG. 3 for folding the bulged part into the general configuration shown in FIG. 4.

In the bulging arrangement of FIG. 8 the part 88 moves vertically and the wedges 90 horizontally. It is possible to provide an arrangement where the part 88 moves horizontally and the wedges vertically. This arrangement is advantageous where gravity feed of the tubular parts to the bulging die is utilized.

In summary, it will be appreciated that the two methods of forming the stator laminations disclosed herein is generally the same but differs in the final coining operation. Thus, as has been previously described, it is possible to fold and simultaneously coin individual laminations which are then stacked to form the final stator core shown in FIG. 6. It is preferred, however, to only individually fold the C-shaped parts, stack them together and apply rivets thereto, and then perform the final coining or forming operation of the stacked assembly by apparatus such as that shown in FIG. 7.

It will of course be appreciated that the various dies disclosed herein will take various forms depending upon the type of stator core that is to be manufactured. Thus, if the stator core is to have a uniform outer dimension, that is, a type of stator core that does not have the larger diameter laminations 42 and 44, the coining die of FIG. 7 would include an arrangement whereby the annular outer die part would engage the entire outer periphery of the stacked stator core in order to confine the entire outer wall of the stator core to a predetermined dimension.

It will be appreciated from the foregoing that the only scrap produced by the method of this invention is the material pierced out of the stator laminations to form the stator slots 38, the material of the holes for receiving the rivets that hold the stator laminations together and the material of the through bolt slots 43. Where the laminations are held together by methods not requiring holes, such as welding, there would also be no scrap produced by forming holes in the stator laminations.

The method of this invention results in a considerable savings since the amount of scrap produced is reduced as compared to other known methods of manufacturing stator laminations. The final stator lamination part uses only the quantity of material provided by the original tubular part 10. Thus, the length of the material for the part shown in FIG. 1 will only be a length which is sufficient to be folded into the configuration shown in FIG. 4 to provide the final stator lamination.

As previously pointed out the tubular parts are folded as a step in manufacturing stator laminations leaving two walls to pierce in forming the stator slots. In order to avoid punching through two thicknesses of material it is possible to form single thickness disks after a tubular part is folded to the shape shown in FIG. 4. This is accomplished by shearing off the edge 10c of a folded lamination leaving two separate annular disks. With this method the inner diameter of the disks are fixed by the folding operation and the outer diameter by the shearing operation. After the separate disks are provided they are individually pierced to form the stator slots and the laminations are then stacked to form a stator core. The preferred arrangement, however, is to use the folded lamination as shown in FIG. 4 without shearing off edge 10c even though this means piercing or cutting through two thicknesses of metal to form the stator slots and other openings that may be required.

What is claimed is:

1. A method of manufacturing an annular lamination for a magnetic core of electrical apparatus, the steps comprising, providing a length of tubular magnetic material, bending the tube wall of said tubular material into a shape that provides a concave inner wall and a convex outer wall, forcing said concave inner wall together to form an annular disk, said outer convex wall ultimately forming parallel end faces for said disk, and then cutting a plurality of slots in said annular disk for the reception of an electrical conductor.

2. A method of manufacturing an annular stator lamination having radially inwardly extending slots for receiving a conductor means, the steps comprising, providing a length of tubular magnetic material, folding said length of tubular material such that half sections of the inner wall of said tubular material are forced into abutting relationship to provide an annular disk-shaped part, and then forming a plurality of slots in said annular disk which are adapted to receive a conductor means.

3. A method of manufacturing stator laminations for dynamoelectric machines from flat sheet steel material, the steps comprising, forming said sheet steel material into an elongated tube, cutting off a length of tubular material from said elongated tube to provide a tubular part of predetermined length, folding inner wall sections of said tubular part toward each other, forcing the inner wall sections of said folded part into engagement with each other while simultaneously confining said material radially at its inner and outer diameter, and then piercing said part to provide slots for the reception of an electrical conductor.

4. A method of manufacturing an annular magnetic part for the magnetic core of electrical apparatus, the steps comprising, providing a length of tubular magnetic material, bending the wall of said tubular material into a generally C-shaped configuration, compressing said C-shaped part axially to force opposing inner wall sections of said tubular part into direct engagement with each other and during this operation confining the flow of metal material at the inner and outer diameters of said part to form an annular disk having a precise radial dimension, and then forming slots in said annular disk for the reception of a conductor means.

5. A method of manufacturing an annular stator core for a dynamoelectric machine, the steps comprising, providing lengths of tubular magnetic material, folding each length of tubular magnetic material such that half sections of the inner wall of tubular material are moved into abutting relationship to provide annular disk-shaped parts, forming a plurality of slots in each annular disk-shaped part which are adapted to receive a conductor means, stacking a plurality of said disk-shaped parts such that the slots in the parts are aligned and securing said parts together by a plurality of rivets, and then subjecting said stack of disk-shaped parts to axial pressure while confining the inner and outer diameter of said parts to a predetemined dimension to thereby form a stator core having a predetermined inner and outer diameter and a predetermined axial dimension.

6. A method of manufacturing a magnetic core for a dynamoelectric machine, the steps comprising, providing a plurality of lengths of tubular magnetic material, folding each length of magnetic material such that half sections of the inner wall of said tubular material are forced into abutting relationship to provide a series of annular disk-shaped parts, stacking a predetermined number of said disk-shaped parts and then axially compressing said predetermined number of disk-shaped parts while confining the inner and outer diameters of said disk-shaped parts to thereby provide a magnetic core comprised of a plurality of disk-shaped parts having a predetermined inner and outer diameter and a predetermined axial dimension which corresponds substantially to the final dimension of said magnetic core.

7. A method of manufacturing an annular stator core for a dynamoelectric machine, the steps comprising, providing lengths of tubular magnetic material, bending each length of tubular magnetic material into a generally C-shaped configuration, folding each C-shaped part such that half sections of the inner wall of each C-shaped part are moved into abutting relationship to provide annular disk-shaped parts, stacking a predetermined number of said annular disk-shaped parts and then axially compressing said disk-shaped parts while confining the inner and outer diameters of said disk-shaped parts to thereby provide a magnetic core comprised of a plurality of disk-shaped parts having a predetermined inner and outer diameter and a predetermined axial dimension which corresponds substantially to the final dimension of said magnetic core.

8. A method of manufacturing an annular stator core for a dynamoelectric machine, the steps comprising, providing a length of flat sheet steel material, forming said sheet steel material into an elongated tube, cutting off lengths of tubular material from said elongated tube to provide tubular parts of predetermined lengths, bending the wall of said tubular parts into a generally C-shaped configuration, compressing said C-shaped parts axially to force the opposing inner wall sections of said tubular parts into engagement with each other to thereby form annular disk-shaped parts, forming a plurality of stator slots in each annular disk, stacking a plurality of said disk-shaped parts such that the slots in the parts are aligned, and then subjecting said stack of disk-shaped parts to axial pressure while confining the inner and outer diameter of said parts to predetermined dimensions to thereby form a stator core having a predetermined inner and outer diameter and a predetermined axial dimension.

9. A method of forming annular laminations for use in manufacturing an annular magnetic core for electrical apparatus comprising, providing a length of tubular magnetic material, bending the tube wall of said tubular material into a generally C-shaped configuration, compressing said C-shaped part axially to force opposing inner wall sections of said tubuular part into engagement to form an annular disk having an edge connecting annular disk portions, removing said connecting edge to form a pair of separated annular disks, and then cutting slots in said separated disks which are adapted to receive an electrical conductor.

References Cited
UNITED STATES PATENTS

| | | | |
|---|---|---|---|
| 3,518,754 | 7/1970 | Pleiss et al. | 29—596 |
| 3,490,143 | 1/1970 | Hull | 29—596 |
| 2,469,100 | 5/1949 | Andrus | 29—596 |

JOHN F. CAMPBELL, Primary Examiner

D. M. HEIST, Assistant Examiner

U.S. Cl. X.R.

29—609, 403